(12) United States Patent
Ishioka et al.

(10) Patent No.: US 11,033,849 B2
(45) Date of Patent: Jun. 15, 2021

(54) HONEYCOMB STRUCTURE

(71) Applicant: NGK Insulators, Ltd., Nagoya (JP)

(72) Inventors: Tomohiro Ishioka, Nagoya (JP);
Hirotaka Yamamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 156 days.

(21) Appl. No.: 16/298,165

(22) Filed: Mar. 11, 2019

(65) Prior Publication Data

US 2019/0291038 A1 Sep. 26, 2019

(30) Foreign Application Priority Data

Mar. 23, 2018 (JP) .............................. JP2018-057065

(51) Int. Cl.
  *B01D 46/24* (2006.01)
  *F01N 3/28* (2006.01)
  *B01D 39/20* (2006.01)

(52) U.S. Cl.
  CPC ....... *B01D 46/2474* (2013.01); *B01D 46/247* (2013.01); *B01D 46/2429* (2013.01); *B01D 46/2455* (2013.01); *B01D 46/2459* (2013.01); *B01D 39/2068* (2013.01);
  (Continued)

(58) Field of Classification Search
  None
  See application file for complete search history.

(56) References Cited

U.S. PATENT DOCUMENTS

2007/0119135 A1    5/2007  Miao et al.
2009/0005240 A1*   1/2009  Noguchi ............... C04B 35/195
                                                       502/251
(Continued)

FOREIGN PATENT DOCUMENTS

JP      2004322082 A  * 11/2004
JP      2009-517211 A    4/2009
JP      2013-052367 A    3/2013

OTHER PUBLICATIONS

Suwabe et al., machine translation of JP 2004-322082 Abstract and Description, Nov. 18, 2004 (Year: 2004).*

(Continued)

*Primary Examiner* — Humera N. Sheikh
*Assistant Examiner* — Mary I Omori
(74) *Attorney, Agent, or Firm* — Burr & Brown, PLLC

(57) ABSTRACT

The honeycomb structure includes a pillar-shaped honeycomb structure body that includes a porous partition wall. When the thickness (μm) of the partition wall is defined as $T_1$ and, among pores formed in the partition wall, the value of an average pore diameter (μm) of specific pores whose pore diameters measured by a mercury press-in method are 20 to 100 μm is defined as $D_{(20\ to\ 100)}$, $T_1/D_{(20\ to\ 100)}$ that is a value obtained by dividing $T_1$ by $D_{(20\ to\ 100)}$ is not less than 2.4, a ratio of a pore volume of the specific pores to an overall pore volume of the partition wall is 5 to 45%, and a ratio of a pore volume of large pores whose pore diameters are not less than 100 μm to the overall pore volume of the partition wall is not more than 5%.

5 Claims, 2 Drawing Sheets

(52) U.S. Cl.
CPC ............... *B01D 2046/2433* (2013.01); *B01D 2046/2437* (2013.01); *F01N 3/2828* (2013.01); *F01N 2330/30* (2013.01)

(56) References Cited

U.S. PATENT DOCUMENTS

2011/0085941 A1* 4/2011 Ogyu ................ B01D 46/2429
   422/180
2013/0059724 A1   3/2013 Hirose et al.

OTHER PUBLICATIONS

Japanese Notification (with English translation), Japanese Application No. 2018-057065, dated Apr. 13, 2021 (2 pages).

* cited by examiner

HONEYCOMB STRUCTURE

The present application is an application based on JP 2018-057065 filed on Mar. 23, 2018 with Japan Patent Office, the entire contents of which are incorporated herein by reference.

BACKGROUND OF THE INVENTION

Field of the Invention

The present invention relates to a honeycomb structure. More particularly, the present invention relates to a honeycomb structure that can suppress the decrease in isostatic strength while maintaining a desired catalyst filling rate.

Description of the Related Art

At present, developed countries are considering more stringent regulations as NOx regulation for a diesel car and a truck. Various technologies for processing NOx in exhaust gas have been proposed for such the NOx regulation. For example, such the technologies include, as one example, a technology for loading a selective catalytic reduction catalyst (hereinafter, also called "SCR catalyst") etc. in a honeycomb structure having a porous partition wall and purifying NOx in exhaust gas by using the honeycomb structure (e.g., see Patent Document 1).

The NOx treatment using the honeycomb structure as described above can improve purification performance by increasing an amount of a catalyst to be loaded in the honeycomb structure. On the other hand, when performing the NOx treatment after providing a honeycomb structure in which a catalyst is loaded in an exhaust system of a diesel car etc., the rise in pressure loss may present a problem. Particularly, when an amount of a catalyst to be loaded to improve purification performance is increased, the rise in the pressure loss of the honeycomb structure may become more remarkable. In other words, in the NOx treatment using the honeycomb structure, "improvement of purification performance" and "suppression of increase in pressure loss" have a relation of trade-off. For this reason, a technology for increasing the porosity of the partition wall of the honeycomb structure has been proposed in order to break through such the trade-off. Moreover, a thin-walled technology for thinning the partition wall of the honeycomb structure has been also proposed. For example, it is considered that the rise in pressure loss can be suppressed by increasing the porosity of the partition wall and thinning the partition wall of the honeycomb structure even if an amount of a catalyst to be loaded is increased.

[Patent Document 1] JP-A-2013-052367

However, the honeycomb structure in which the porosity of the partition wall is increased has a problem that isostatic strength is decreased. Moreover, the honeycomb structure in which the partition wall is thinned also has a problem that isostatic strength is decreased.

The present invention has been achieved in view of the problems of the above conventional technology. According to the present invention, there is provided a honeycomb structure that can suppress the decrease in isostatic strength.

SUMMARY OF THE INVENTION

According to the present invention, there is provided a honeycomb structure to be described below.

According to a first aspect of the present invention, a honeycomb structure is provided and includes a pillar-shaped honeycomb structure body that includes a porous partition wall arranged to surround a plurality of cells that acts as fluid through channels extending from a first end face to a second end face, wherein, when a thickness (μm) of the partition wall is defined as $T_1$ and, among pores formed in the partition wall, a value of an average pore diameter (μm) of specific pores whose pore diameters measured by a mercury press-in method are 20 to 100 μm is defined as $D_{(20\ to\ 100)}$, $T_1/D_{(20\ to\ 100)}$ that is a value obtained by dividing the $T_1$ by the $D_{(20\ to\ 100)}$ is not less than 2.4, a ratio of a pore volume of the specific pores to an overall pore volume of the partition wall is 5 to 45%, and a ratio of a pore volume of large pores whose pore diameters is not less than 100 μm to the overall pore volume of the partition wall is not more than 5%.

According to a second aspect of the present invention, the honeycomb structure according to the first aspect is provided, wherein the $T_1$ is 60 to 140 μm.

According to a third aspect of the present invention, the honeycomb structure according to the first or second aspects is provided, wherein the $T_1/D_{(20\ to\ 100)}$ is 2.4 to 4.0.

According to a fourth aspect of the present invention, the honeycomb structure according to any one of first to third aspects is provided, wherein a porosity of the partition wall is 45 to 65%.

According to a fifth aspect of the present invention, the honeycomb structure according to any one of first to fourth aspects is provided, wherein a cell density of the honeycomb structure body is 46.5 to 116.3 pcs/cm².

EFFECTS OF THE INVENTION

The honeycomb structure according to the present invention can suppress the decrease in isostatic strength as compared with a conventional honeycomb structure having the same porosity. In other words, the honeycomb structure according to the present invention has, when the thickness (μm) of the partition wall is defined as $T_1$ and the value of an average pore diameter (μm) of specific pores whose pore diameters are 20 to 100 μm is defined as $D_{(20\ to\ 100)}$, a value of $T_1/D_{(20\ to\ 100)}$ that is not less than 2.4. By employing such the configuration, it is possible to effectively suppress the decrease in isostatic strength. For this reason, it is possible to realize the high porosity of the partition wall that can maintain a desired catalyst filling rate while effectively suppressing the decrease in isostatic strength. For example, the high porosity of the partition wall enables to increase the filling rate of a catalyst into the pores of the partition wall and also to effectively suppress the increase in pressure loss of the honeycomb structure. Particularly, the honeycomb structure according to the present invention can effectively suppresses the decrease in isostatic strength while maintaining a catalyst filling property into pores that has a merit with respect to a pressure loss.

DETAILED DESCRIPTION OF THE PRESENT INVENTION

Hereinafter, embodiments of the present invention will be explained, but the present invention is not limited to the following embodiments. Therefore, it should be understood that those in which modifications, improvements, etc. have been appropriately added to the following embodiments based on the ordinary knowledge of those skilled in the art without departing from the spirit of the present invention are within the scope of the present invention.

(1) Honeycomb Structure

Figure 1:
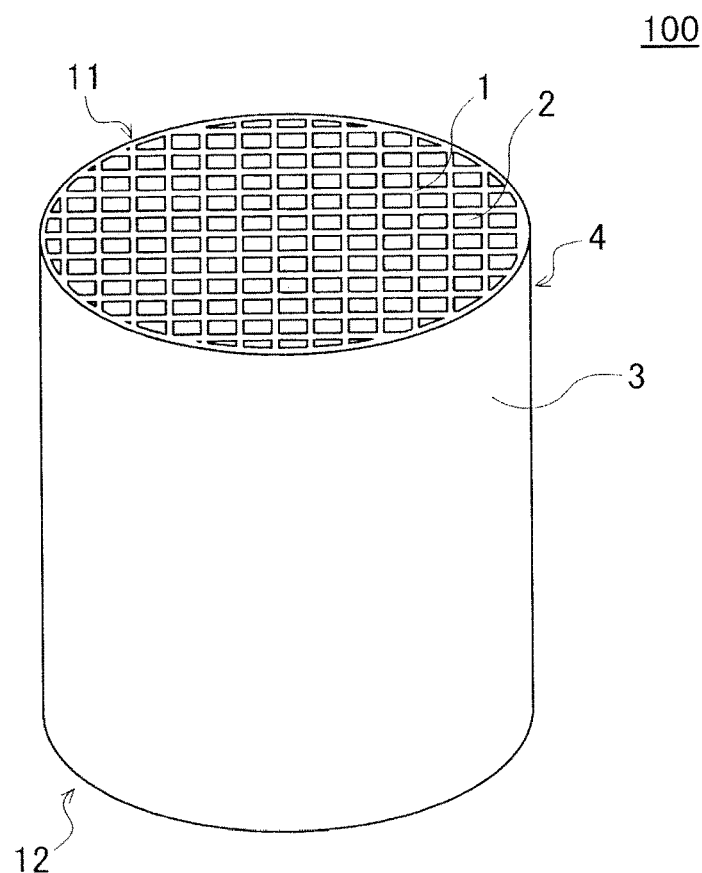
FIG. 1 is a perspective view schematically showing one embodiment of a honeycomb structure according to the present invention.
Figure 2:
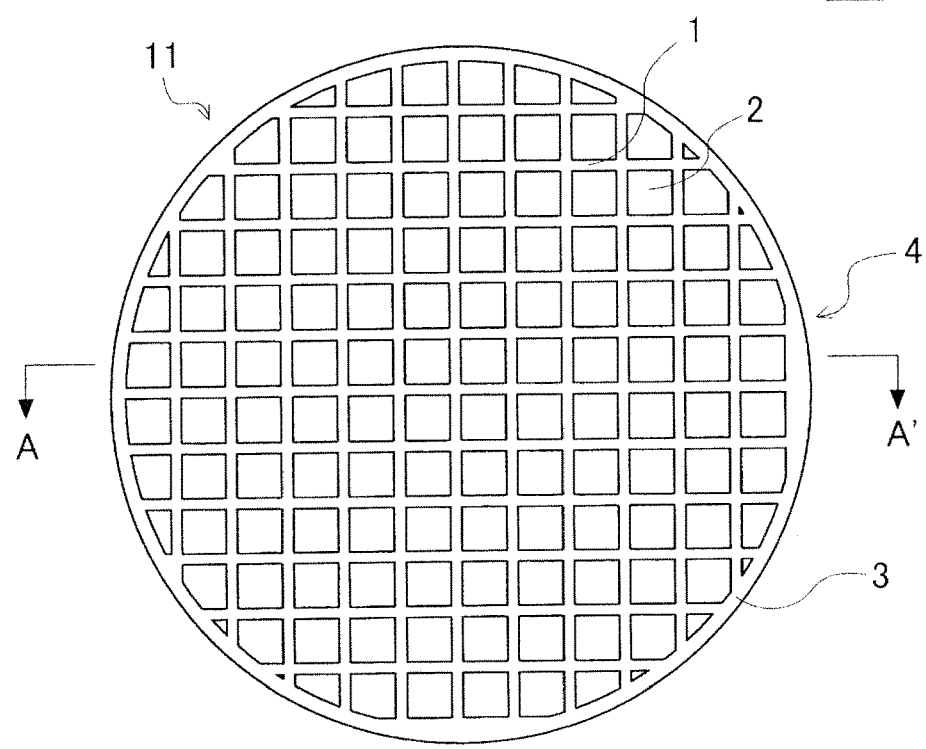
FIG. 2 is a plan view showing a first end face of the honeycomb structure shown in FIG. 1.
Figure 3:
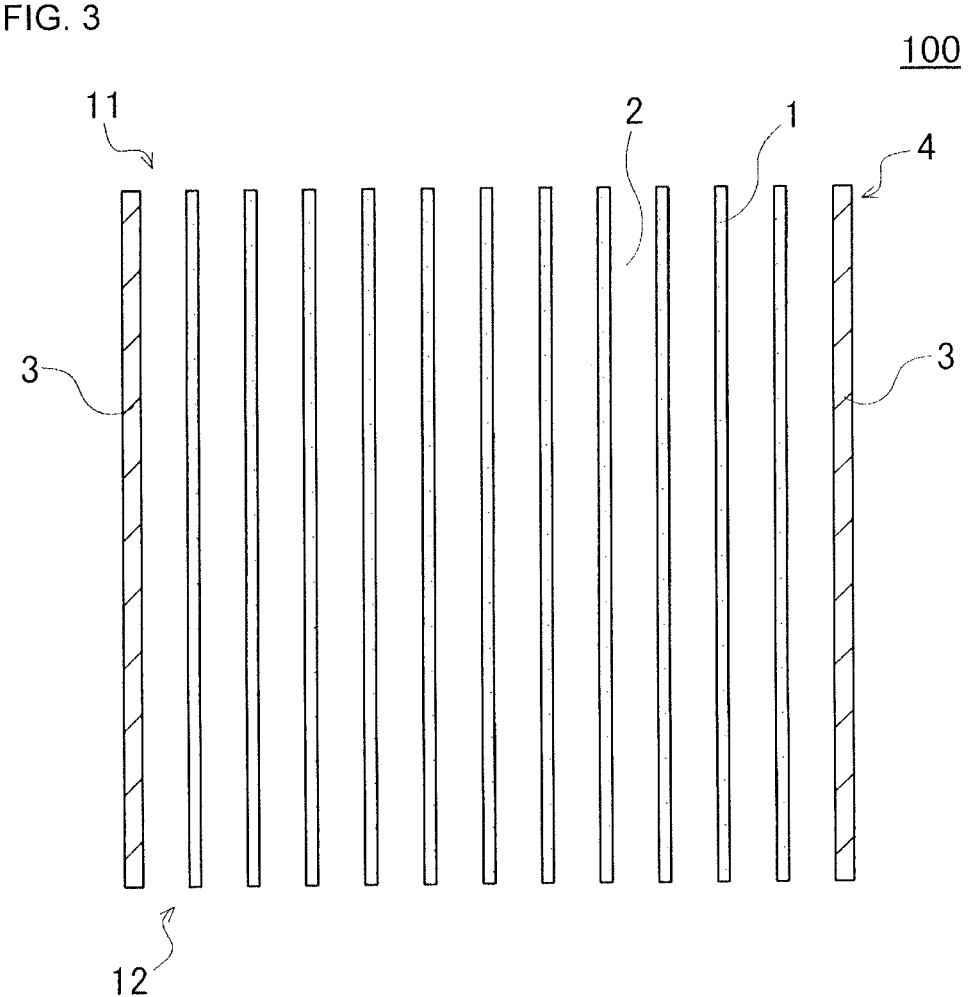
FIG. 3 is a cross-sectional view schematically showing a cross section viewed from the A-A' line in FIG. 2.

One embodiment of a honeycomb structure according to the present invention is a honeycomb structure 100 as shown in FIGS. 1 to 3. Herein, FIG. 1 is a perspective view schematically showing one embodiment of the honeycomb structure according to the present invention. FIG. 2 is a plan view showing a first end face of the honeycomb structure shown in FIG. 1. FIG. 3 is a cross-sectional view schematically showing a cross section viewed from the A-A' line in FIG. 2.

As shown in FIGS. 1 to 3, the honeycomb structure 100 according to the present embodiment includes a pillar-shaped honeycomb structure body 4 that includes a first end face 11 and a second end face 12. The honeycomb structure body 4 includes a porous partition wall 1 arranged to surround a plurality of cells 2 that acts as fluid through channels extending from the first end face 11 to the second end face 12. In the honeycomb structure 100 according to the present embodiment, the honeycomb structure body 4 is configured to have a round-pillar shape and further includes a circumferential wall 3 on a circumferential side face thereof. In other words, the circumferential wall 3 is disposed to surround the partition wall 1 disposed in a grid pattern.

The honeycomb structure 100 according to the present embodiment has a technical feature with respect to the thickness of the partition wall 1 and the pore diameters and the pore volume of pores formed in the partition wall 1. Hereinafter, the thickness (μm) of the partition wall 1 is defined as "$T_1$". "$T_1$" may be described as "thickness $T_1$". Moreover, among the pores formed in the partition wall 1, pores whose pore diameters measured by a mercury press-in method are 20 to 100 μm are defined as "specific pores". Herein, the value of an average pore diameter (μm) of the specific pores is defined as "$D_{(20\ to\ 100)}$". "$D_{(20\ to\ 100)}$" may be described as "average pore diameter $D_{(20\ to\ 100)}$". The "average pore diameter of specific pores" means an average pore diameter in which the values of the pore diameters of specific pores (i.e., pores whose pore diameters are 20 to 100 μm) are described as a population. Furthermore, pores whose pore diameters measured by the mercury press-in method are more than 100 μm are defined as "large pores".

The honeycomb structure 100 according to the present embodiment has a feature that $T_1/D_{(20\ to\ 100)}$ obtained by dividing $T_1$ by $D_{(20\ to\ 100)}$ has a value of 2.4 or more. Moreover, a ratio of the pore volume of specific pores to the total pore volume (overall pore volume) of the partition wall 1 is 5 to 45%. Furthermore, a ratio of the pore volume of large pores to the total pore volume (overall pore volume) of the partition wall 1 is not more than 5%. By employing such the configuration, the decrease in isostatic strength can be effectively suppressed as compared with a conventional honeycomb structure having the same porosity. For this reason, it is possible to realize the high porosity of the partition wall 1 that can effectively suppress the decrease in isostatic strength and also maintain a desired catalyst filling rate. For example, due to the high porosity of the partition wall 1, the filling rate of a catalyst into the pores of the partition wall 1 can be increased and the increase in pressure loss of the honeycomb structure 100 can be also effectively suppressed.

The specific pores whose pore diameters are 20 to 100 μm and the large pores whose pore diameters are more than 100 μm are pores that are mainly formed of pore former added to ceramic raw material powder in a manufacturing step for the ceramic porous partition wall 1. On the other hand, the pores whose pore diameters are less than 20 μm are micropores that are mainly formed from the ceramic raw material powder in the ceramic porous partition wall 1. The honeycomb structure 100 according to the present embodiment can be made so that "$T_1/D_{(20\ to\ 100)}$" is not less than 2.4 by adjusting the particle diameters of the pore former added to the ceramic raw material powder in the manufacturing step. For example, "$T_1/D_{(20\ to\ 100)}$" can have a value of 2.4 or more by making the average particle diameter of the pore former in the manufacturing step smaller than the thickness $T_1$ of the partition wall 1.

The average pore diameter of the partition wall 1 can be measured by using Autopore 9500 (product name) made by Micromeritics, for example. The measurement of the average pore diameter can be performed, after cutting out a portion of the partition wall 1 from the honeycomb structure 100 as a test piece, by using the test piece obtained in this way. A method calculating for the average pore diameter $D_{(20\ to\ 100)}$ of the specific pores is first to make a pore size distribution graph, in which a horizontal axis is a pore diameter and a vertical axis is a log differential pore volume, from the measurement result of a cumulative pore volume of the partition wall 1 to be described later. Next, a median diameter in a zone in which the pore diameters are 20 μm to 100 μm in the made pore size distribution graph is defined as the average pore diameter $D_{(20\ to\ 100)}$ of the specific pores.

The total pore volume of the partition wall 1 and the pore volume of the specific pores and the large pores can be calculated from the cumulative pore volume of the partition wall 1 measured by the mercury press-in method. The measurement of the cumulative pore volume of the partition wall 1 can be performed by using Autopore 9500 (product name) made by Micromeritics, for example. The measurement of the cumulative pore volume of the partition wall 1 can be performed by the following method. First, a portion of the partition wall 1 is cut out from the honeycomb structure 100 to make a test piece to measure a cumulative pore volume. The size of the test piece has no particular limitation, but it is preferable that the test piece is a rectangular solid in which the longitudinal, lateral, and height lengths are approximately 10 mm, approximately 0.10 mm, and approximately 10 mm, respectively, for example. The region of the partition wall 1 from which a test piece is cut out has no particular limitation, but it is preferable that the test piece is made by cutting out from the vicinity of the center in the axial direction of the honeycomb structure body 4. The obtained test piece is housed inside a cell for measurement of a measuring device and the cell for measurement is depressurized. Next, mercury is introduced into the cell for measurement. Next, the mercury introduced into the cell for measurement is pressurized and a volume of the mercury pushed into pores located in the test piece is measured during pressurization. In this case, as a pressure to be added to the mercury is increased, the mercury is sequentially pushed from pores whose pore diameters are large to pores whose pore diameters are small. Therefore, a relationship between "the pore diameters of pores formed in the test piece" and "the cumulative pore volume" can be calculated from a relationship between "the pressure to be added to mercury" and "the volume of mercury pushed into the pores". "The cumulative pore volume" is a value obtained by accumulating pore volumes from the minimum pore diameter to the specified pore diameter. For example, "a pore volume rate having a pore diameter of 20 μm or less" means a percentage ($pv_1/PV_{all} \times 100\%$) of a ratio of a pore volume $p_{v1}$ of pores whose pore diameters are not more than 20 μm to a total pore volume $PV_{all}$ indicated by the cumulative pore volume. Similarly, "a pore volume rate having a pore diameter of 100 μm or more" means a percentage ($pv_2/PV_{all} \times 100\%$) of a ratio of a pore volume $pv_2$ of pores whose pore diameters are not less than 100 μm to the total pore volume $PV_{all}$ indicated by the cumulative pore volume.

The thickness $T_1$ of the partition wall 1 can be measured by using a scanning electron microscope or a microscope, for example. The thickness $T_1$ of the partition wall 1 is preferably 60 to 140 μm, is further preferably 60 to 114 μM, and is particularly preferably 60 to 90 μm. Because the honeycomb structure 100 according to the present embodiment can effectively suppress the decrease in isostatic strength, it is possible to reduce the wall thickness of the partition wall 1 as described above. For this reason, according to the honeycomb structure 100 of the present embodiment, the low pressure loss of the honeycomb structure 100 can be also realized. When the thickness $T_1$ of the partition wall 1 is less than 60 μm, the thickness $T_1$ of the partition wall 1 is extremely too thin and thus sufficient strength may not be obtained. On the other hand, when the thickness $T_1$ of the partition wall 1 exceeds 140 μm, the pressure loss of the honeycomb structure 100 may be increased.

When $T_1/D_{(20\ to\ 100)}$ is less than 2.4, isostatic strength is decreased as compared with the honeycomb structure having the same porosity. It is preferable that $T_1/D_{(20\ to\ 100)}$ is 2.40 to 4.0.

When a ratio of the pore volume of the specific pores to the total pore volume of the partition wall 1 is less than 5%, this is not preferable in terms of a catalyst filling property into pores. Hereinafter, a ratio of the pore volume of the specific pores to the total pore volume of the partition wall 1 may be simply called "a ratio of pore volume of the specific pores". The ratio of the pore volume of the specific pores is preferably 5 to 45% and is further preferably 10 to 45%.

When a ratio of the pore volume of the large pores to the total pore volume of the partition wall 1 exceeds 5%, this is not preferable in terms of the strength of the honeycomb structure 100. Hereinafter, a ratio of the pore volume of the large pores to the total pore volume of the partition wall 1 may be simply called "a ratio of pore volume of the large pores". It is preferable that the ratio of the pore volume of the large pores is not more than 4%. The lower limit of the ratio of the pore volume of the large pores is 0%.

Although the porosity of the partition wall 1 is not particularly limited, the porosity is preferably 45 to 65% and is further preferably 45 to 55%. When the porosity of the partition wall 1 is less than 45%, there is a concern that a pore volume that can fill up a catalyst cannot be sufficiently secured. When the porosity of the partition wall 1 exceeds 65%, this is not preferable from the viewpoint of the strength degradation of the honeycomb structure 100. The porosity of the partition wall 1 can be measured by using Autopore 9500 (product name) made by Micromeritics, for example. The measurement of the porosity can be performed, after cutting out a portion of the partition wall 1 from the honeycomb structure 100 as a test piece, by using the test piece obtained in this way.

The honeycomb structure 100 according to the present embodiment can increase the filling rate of a catalyst into the pores of the partition wall 1 due to the high porosity of the partition wall 1. For this reason, it is also possible to suppress the rise in pressure loss after loading a catalyst for exhaust gas purification. Therefore, even if an amount of a catalyst to be loaded is increased, for example, it is possible to suppress the rise in pressure loss of the honeycomb structure 100 and thus it is possible to achieve compatibility between "the improvement of purification performance" and "the suppression of increase in pressure loss".

The shape of the cells 2 formed in the honeycomb structure body 4 has no particular limitation. For example, the shape of the cells 2 on a cross section orthogonal to the extending direction of the cells 2 can include a polygonal shape, a circular shape, an elliptical shape, and the like. A polygonal shape can include a triangle, a quadrangle, a pentagon, a hexagon, an octagon, and the like. In addition, it is preferable that the shape of the cells 2 is a triangle, a quadrangle, a pentagon, a hexagon, and/or an octagon. Moreover, in terms of the shape of the cells 2, the shapes of all the cells 2 may be the same shapes or may be different shapes. For example, although it is not shown, cells may be a mixture of quadrangular cells and octagonal cells. Moreover, in terms of the size of the cells 2, the sizes of all the cells 2 may be the same or may be different from each other. For example, although it is not shown, among the plurality of cells, the size of some cells may be made larger and the size of the other cells may be made relatively smaller. In addition, in the present invention, a cell means a space surrounded by the partition wall.

The cell density of the cells 2 defined by the partition wall 1 is preferably 46.5 to 116.3 pcs/cm² and is further preferably 62 to 93 pcs/cm². By employing such the configuration, the honeycomb structure 100 according to the present embodiment can be preferably used as a purification member (e.g., catalyst carrier and filter) for purifying exhaust gas emitted from an engine of an automobile.

The circumferential wall 3 of the honeycomb structure body 4 may be configured to be integrally with the partition wall 1 or may be a circumferential coat layer formed by applying an outer coating material to surround the partition wall 1. Although it is not shown, during manufacturing, after a partition wall and a circumferential wall are integrally formed and then the formed circumferential wall is removed by a well-known method such as grinding processing, the circumferential coat layer can be provided on the outer circumferential side of the partition wall.

The shape of the honeycomb structure body 4 has no particular limitation. The shape of the honeycomb structure body 4 can include a pillar shape in which the shape of the first end face 11 and the second end face 12 is a circular shape, an elliptical shape, a polygonal shape, or the like.

The size of the honeycomb structure body 4, for example, the length from the first end face 11 to the second end face 12 and the size of a cross section orthogonal to the extending direction of the cells 2 of the honeycomb structure body 4 have no particular limitation. When the honeycomb structure 100 according to the present embodiment is used as a purification member for exhaust gas purification, the above sizes only need to be appropriately selected to obtain optimum purification performance. For example, the length from the first end face 11 to the second end face 12 of the honeycomb structure body 4 is preferably 76 to 254 mm and is further preferably 101.6 to 203 mm. Moreover, the area of the cross section orthogonal to the extending direction of the cells 2 of the honeycomb structure body 4 is preferably 24828.7 to 99314.7 mm² and is further preferably 41043.3 to 72965.9 mm².

It is preferable that the material of the partition wall 1 includes at least one selected from a group consisting of cordierite, silicon carbide, silicon-silicon carbide composite material, cordierite-silicon carbide composite material, silicon nitride, mullite, alumina, and aluminum titanate. The material that constitutes the partition wall 1 is preferably a material in which the materials listed in the group are included 30% by mass or more, is further preferably a material in which the materials are included 40% by mass or more, and is particularly preferably a material in which the materials are included 50% by mass or more. In addition, silicon-silicon carbide composite material is a composite material formed of silicon carbide as an aggregate and silicon as a bonding material. Moreover, cordierite-silicon carbide composite material is a composite material formed of silicon carbide as an aggregate and cordierite as a bonding material. In the honeycomb structure 100 according to the present embodiment, it is particularly preferable that the material constituting the partition wall 1 is cordierite.

In the honeycomb structure 100 according to the present embodiment, a catalyst for exhaust gas purification may be loaded in the partition wall 1 defining the plurality of cells 2. Loading a catalyst in the partition wall 1 means to load a catalyst on the surface of the partition wall 1 and in the pores formed in the partition wall 1. Because the honeycomb structure 100 according to the present embodiment can suppress the decrease in isostatic strength, it is possible to increase an amount of a catalyst to be loaded and thus to achieve the improvement of purification performance due to the high porosity and wall-thinning of the partition wall.

(2) Method of Manufacturing Honeycomb Structure

A method of manufacturing the honeycomb structure according to the present invention has no particular limitation, and can include the following method, for example. First, a plastic kneaded material to make a honeycomb structure body is prepared. The kneaded material to make the honeycomb structure body can be prepared by appropriately adding an addition agent such as binder, a pore former, and water to a material selected from the preferable materials of the honeycomb structure body described above as raw material powder. The raw material powder can include a cordierite raw material for example. The cordierite raw material is a raw material that becomes cordierite by firing, and specifically, it is a raw material blended to have a chemical composition having silica content of 42 to 56% by mass, alumina of 30 to 45% by mass, and magnesia of 12 to 16% by mass.

In the preparation of the kneaded material, a pore diameter distribution of the partition wall can be adjusted by adjusting the particle diameters of the pore former. For example, it is preferable to make the average particle diameter of the pore former smaller than the thickness $T_1$ of the partition wall. The honeycomb structure in which "$T_1/D_{(20\ to\ 100)}$" is 2.4 or more, "the ratio of the pore volume of the specific pores" is 5 to 45%, and "the ratio of the pore volume of the large pores" is 5% or less can be favorably manufactured by using such the pore former.

Next, a pillar-shaped honeycomb formed body, which includes the partition wall defining the plurality of cells and the circumferential wall disposed to surround the partition wall, is made by performing extrusion on the kneaded material obtained in this way. In addition, in terms of the thickness of the partition wall of the honeycomb formed body, it is preferable that the thickness of the partition wall of the honeycomb structure after the firing becomes the desired thickness $T_1$ in accordance with the average particle diameter of the pore former added to the raw material powder.

Next, the obtained honeycomb formed body is dried by a microwave and hot air, for example. Next, the honeycomb structure is manufactured by firing the honeycomb formed body. A firing temperature and a firing atmosphere are different depending on the raw material. Those skilled in the art can select the most suitable firing temperature and firing atmosphere for the selected material.

EXAMPLES

Hereinafter, the present invention will be more specifically explained by using Examples, but the present invention is not limited to these Examples.

Example 1

A kneaded material was prepared by adding a pore former of 10 parts by mass, a dispersing medium of 30 parts by mass, and an organic binder of 1 part by mass to a cordierite raw material of 100 parts by mass, respectively, and by mixing and kneading them. Alumina, aluminum hydroxide, kaolin, talc, and silica were employed as the cordierite raw material. Water was employed as the dispersing medium. Methyl cellulose was employed as the organic binder. Dextrin was employed as the dispersing agent. Hollow resin particles having the average particle diameter of 70 μm were employed as the pore former.

Next, a honeycomb formed body whose entire shape is a round pillar shape was obtained by performing extrusion on the kneaded material by using a die for making the honeycomb formed body. The shape of the cells of the honeycomb formed body employed a quadrangle.

Next, the honeycomb formed body was adjusted to a predetermined size by drying the honeycomb formed body with a microwave dryer and further completely drying the body with a hot-air drying machine and then cutting both end faces of the honeycomb formed body. Next, the honeycomb structure of Example 1 was manufactured by degreasing and firing the dried honeycomb formed body.

The honeycomb structure according to Example 1 had a round pillar shape, and the shape of the first and second end faces was a circular shape. The diameter of the first and second end faces was 266.7 mm. Moreover, the entire length of the cell in the extending direction of the honeycomb structure was 152.4 mm. In the honeycomb structure according to Example 1, the thickness $T_1$ of the partition wall was 88.9 μm and the cell density was 93 pcs/cm². Table 1 shows the thickness $T_1$ of the partition wall and the cell density in the honeycomb structure.

TABLE 1

| | Diameter (mm) | Entire length (mm) | Partition wall thickness $T_1$ (μm) | Cell density (pcs/cm²) | Porosity (%) | $D_{(20\ to\ 100)}$ (μm) | Ratio (%) of pore volume of specific pores | Ratio (%) of pore volume of large pores | $T_1/D_{(20\ to\ 100)}$ |
|---|---|---|---|---|---|---|---|---|---|
| Example 1 | 266.7 | 152.4 | 88.9 | 93 | 50 | 34.0 | 32.5 | 3.5 | 2.6 |
| Example 2 | 266.7 | 152.4 | 88.9 | 93 | 50 | 37.1 | 36.7 | 3.7 | 2.4 |
| Example 3 | 266.7 | 152.4 | 88.9 | 93 | 50 | 30.9 | 24.2 | 3.2 | 2.9 |
| Example 4 | 266.7 | 152.4 | 88.9 | 93 | 50 | 27.9 | 15.8 | 2.8 | 3.2 |
| Example 5 | 266.7 | 152.4 | 88.9 | 93 | 50 | 27.8 | 15.0 | 2.8 | 3.2 |

TABLE 1-continued

|  | Diameter (mm) | Entire length (mm) | Partition wall thickness $T_1$ (μm) | Cell density (pcs/cm²) | Porosity (%) | $D_{(20\ to\ 100)}$ (μm) | Ratio (%) of pore volume of specific pores | Ratio (%) of pore volume of large pores | $T_1/D_{(20\ to\ 100)}$ |
|---|---|---|---|---|---|---|---|---|---|
| Example 6 | 266.7 | 152.4 | 88.9 | 93 | 50 | 27.2 | 13.8 | 2.8 | 3.3 |
| Example 7 | 266.7 | 152.4 | 88.9 | 62 | 50 | 26.5 | 11.7 | 2.7 | 3.4 |
| Example 8 | 266.7 | 152.4 | 88.9 | 62 | 50 | 25.3 | 7.5 | 2.5 | 3.5 |
| Example 9 | 266.7 | 152.4 | 114.3 | 62 | 50 | 43.5 | 45.0 | 4.0 | 2.6 |
| Example 10 | 266.7 | 152.4 | 114.3 | 62 | 50 | 37.1 | 36.7 | 3.7 | 3.1 |
| Example 11 | 266.7 | 152.4 | 114.3 | 62 | 50 | 34.0 | 32.5 | 3.5 | 3.4 |
| Example 12 | 266.7 | 152.4 | 114.3 | 62 | 50 | 27.9 | 15.8 | 2.8 | 4.1 |
| Example 13 | 266.7 | 152.4 | 114.3 | 62 | 50 | 26.5 | 11.7 | 2.7 | 4.3 |
| Comparative Example 1 | 266.7 | 152.4 | 88.9 | 93 | 50 | 43.5 | 45.0 | 4.0 | 2.0 |
| Comparative Example 2 | 266.7 | 152.4 | 88.9 | 93 | 50 | 39.7 | 40.8 | 3.8 | 2.2 |
| Comparative Example 3 | 266.7 | 152.4 | 114.3 | 62 | 50 | 49.0 | 57.5 | 4.5 | 2.3 |

Moreover, "a porosity (%)", "$D_{(20\ to\ 100)}$ (μm)", "a ratio (%) of pore volume of specific pores", "a ratio (%) of pore volume of large pores", and "$T_1/D_{(20\ to\ 100)}$" were calculated with respect to the honeycomb structure according to Example 1. Results are shown in Table 1.

The porosity of the partition wall was measured by using Autopore 9500 (product name) made by Micromeritics. The measurement of the porosity was performed, after cutting out a portion of the partition wall from the honeycomb structure as a test piece, by using the obtained test piece. The test piece was a rectangular solid in which the longitudinal, lateral, and height lengths are approximately 10 mm, approximately 10 mm, and approximately 10 mm, respectively. In addition, the test piece was obtained by cutting out from the vicinity of the center in the axial direction of the honeycomb structure.

The total pore volume of the partition wall was measured by using Autopore 9500 (product name) made by Micromeritics. The measurement of the total pore volume also used the test piece used for the measurement of the porosity. In the measurement of the total pore volume, the cumulative pore volume of the partition wall was measured and "the pore volume of the specific pores whose pore diameters are 20 to 100 μm" and "the pore volume of the large pores whose pore diameters are more than 100 μm" described above were simultaneously measured. Moreover, the average pore diameter $D_{(20\ to\ 100)}$ of the specific pores was calculated based on the obtained measurement result.

In the honeycomb structure according to Example 1, the porosity of the partition wall was 50% and the average pore diameter $D_{(20\ to\ 100)}$ of the specific pores was 34.0 μm. The ratio of the pore volume of the specific pores was 32.5% and the ratio of the pore volume of the large pores was 3.5%.

A catalyst was loaded in the partition wall of the honeycomb structure according to Example 1 in the following method. First, catalyst slurry including zeolite whose average particle diameter is 5 μm was prepared. The catalyst slurry was loaded in the honeycomb structure so that a loaded amount per unit volume after drying is 148 g/L. In the loading of the catalyst, the honeycomb structure was subjected to dipping, and surplus catalyst slurry was blown off with air so to be impregnated. Then, by drying the honeycomb structure at the temperature of 120° C. and further performing a heat treatment at 500° C. for 3 hours, a honeycomb structure in which a catalyst is loaded is obtained. The loaded amount of the catalyst loaded in the honeycomb structure according to Example 1 is 148 g/L.

TABLE 2

|  | Isostatic strength (MPa) | Filling rate (%) of catalyst | Comprehensive evaluation |
|---|---|---|---|
| Example 1 | 2.3 | 60 | A |
| Example 2 | 1.6 | 65 | A |
| Example 3 | 2.4 | 60 | A |
| Example 4 | 2.9 | 55 | A |
| Example 5 | 2.8 | 55 | A |
| Example 6 | 3.0 | 55 | A |
| Example 7 | 3.2 | 55 | A |
| Example 8 | 3.4 | 50 | A |
| Example 9 | 2.30 | 65 | A |
| Example 10 | 2.40 | 55 | A |
| Example 11 | 2.40 | 55 | A |
| Example 12 | 2.50 | 45 | B |
| Example 13 | 2.60 | 45 | B |
| Comparative Example 1 | 0.90 | 65 | C |
| Comparative Example 2 | 1.40 | 65 | C |
| Comparative Example 3 | 1.40 | 65 | C |

The measurement of "isostatic strength (MPa)" was performed on the honeycomb structure according to Example 1 in the following method. Moreover, "filling rate (%) of catalyst" was calculated in the following method. Furthermore, based on the results of "isostatic strength (MPa)" and "catalyst filling rate (%)", "comprehensive evaluation" was performed based on the following evaluation criterion. The results are shown in Table 2.

Isostatic Strength (MPa)

The measurement of the isostatic strength was performed based on an isostatic breaking strength test regulated by M505-87 of Japanese Automobile Standards (JASO standard) issued by Society of Automotive Engineers of Japan, Inc. The isostatic breaking strength test is a test in which the honeycomb structure is put in a rubber tubular container and is covered with an aluminum plate and then is subjected to isostatic pressure compression underwater. The isostatic strength measured by the isostatic breaking strength test is indicated by a pressurized pressure value (MPa) when the honeycomb structure is broken. The case where isostatic strength is not less than 1.5 MPa is defined as "Pass" and the case where it is less than 1.5 MPa is defined as "Fail".

Filling Rate (%) of Catalyst

A test piece for measurement of 20 mm in length, 20 mm in width, and 20 mm in height was cut out from the honeycomb structure body of the honeycomb structure according to Example 1. After performing polishing on the partition wall of the test piece, SEM images were arbitrarily captured in 3 fields of view by using a scanning electron microscope (SEM). The 1 field of view of the imaging fields of view had a size in which the X direction is the thickness (μm) of one piece of the partition wall and the Y direction is 600 μm. Then, when the catalyst is loaded in the honeycomb structure, a ratio (percentage) of a volume ($V_1$) of the pores in which the catalyst is actually filled up to a volume ($V_0$) of all the pores formed in the partition wall was calculated. Specifically, the volume ($V_0$) of all the pores formed in the partition wall was calculated from pore parts extracted by performing binarization by image analysis (i.e., pores in which the catalyst is not penetrated and pores in which the catalyst is penetrated). Next, the volume $V_1$ was calculated by loading the catalyst in the honeycomb structure and performing binarization by image analysis to extract the pore part in which the catalyst is penetrated. Then, the catalyst filling rate (%) was calculated by using these values. Herein, the value of the filling rate (%) of the catalyst in Table 2 is an arithmetic average value of catalyst filling rates of SEM images of 3 fields of view. In addition, the filling rate of a catalyst is defined as "Pass" when the rate is not less than 40%.

Comprehensive Evaluation

Evaluation A: The case where the isostatic strength indicates Pass and the filling rate of catalyst is not less than 50% is defined as Evaluation A.

Evaluation B: The case where the isostatic strength indicates Pass and the filling rate of catalyst is not less than 40% and is less than 50% is defined as Evaluation B.

Evaluation C: The case where the isostatic strength indicates Fail or the filling rate of catalyst is less than 40% is defined as Evaluation C.

Examples 2 to 13

Honeycomb structures obtained by changing "the thickness $T_1$ (μm) of the partition wall", "the cell density (pcs/cm$^2$)", "$D_{(20\ to\ 100)}$ (μm)", "the ratio (%) of the pore volume of the specific pores", "the ratio (%) of the pore volume of the large pores", and "$T_1/D_{(20\ to\ 100)}$" were made as indicated in Table 1. The adjustment of "$D_{(20\ to\ 100)}$ (μm)", "the ratio (%) of the pore volume of the specific pores", and "the ratio (%) of the pore volume of the large pores" was performed by adjusting the particle diameters of a pore former to be added to a forming raw material.

In Example 2, a pore former of an average particle diameter 80 μm was used.

In Example 3, a pore former of an average particle diameter 50 μm was used.

In Example 4, a pore former of an average particle diameter 30 μm was used.

In Example 5, a pore former of an average particle diameter 28 μm was used.

In Example 6, a pore former of an average particle diameter 25 μm was used.

In Example 7, a pore former of an average particle diameter 20 μm was used.

In Example 8, a pore former of an average particle diameter 10 μm was used.

In Example 9, a pore former of an average particle diameter 100 μm was used.

In Example 10, a pore former of an average particle diameter 80 μm was used.

In Example 11, a pore former of an average particle diameter 70 μm was used.

In Example 12, a pore former of an average particle diameter 30 μm was used.

In Example 13, a pore former of an average particle diameter 20 μm was used.

Comparative Examples 1 to 3

Honeycomb structures obtained by changing "the thickness $T_1$ (μm) of the partition wall", "the cell density (pcs/cm$^2$)", "$D_{(20\ to\ 100)}$ (μm)", "the ratio (%) of the pore volume of the specific pores", "the ratio (%) of the pore volume of the large pores", and "$T_1/D_{(20\ to\ 100)}$" were made as indicated in Table 1. The adjustment of "$D_{(20\ to\ 100)}$ (μm)", "the ratio (%) of the pore volume of the specific pores", and "the ratio (%) of the pore volume of the large pores" was performed by adjusting the particle diameters of a pore former to be added to a forming raw material.

In Comparative Example 1, a pore former of an average particle diameter 100 μm was used.

In Comparative Example 2, a pore former of an average particle diameter 90 μm was used.

In Comparative Example 3, a pore former of an average particle diameter 130 μm was used.

The measurement of "the isostatic strength (MPa)" was performed on the honeycomb structures of Examples 2 to 13 and Comparative Examples 1 to 3 in the same manner as in Example 1. Moreover, in the same manner as in Example 1, "the filling rate (%) of catalyst" was calculated and "comprehensive evaluation" was performed based on these results. The results are shown in Table 2.

(Result)

The honeycomb structures of Examples 1 to 13 had high isostatic strength and also satisfied a passing standard about "the filling rate (%) of catalyst". The honeycomb structures of Comparative Examples 1 to 3 had remarkably low isostatic strength.

INDUSTRIAL APPLICABILITY

The honeycomb structures according to the present invention can be used as a catalyst carrier to load a catalyst for exhaust gas purification.

DESCRIPTION OF REFERENCE NUMERALS

1 partition wall
2 cell
3 circumferential wall
4 honeycomb structure body
11 first end face
12 second end face
100 honeycomb structure

What is claimed is:
1. A honeycomb structure comprising:
a pillar-shaped honeycomb structure body that includes a porous partition wall arranged to surround a plurality of cells that acts as fluid through channels extending from a first end face to a second end face, wherein
when a thickness in μm of the partition wall is defined as $T_1$ and, among pores formed in the partition wall, a value of an average pore diameter in μm of specific pores whose pore diameters measured by a mercury press-in method are 20 to 100 μm is defined as $D_{(20\ to\ 100)}$,

$T_1/D_{(20\ to\ 100)}$ that is a value obtained by dividing the $T_1$ by the $D_{(20\ to\ 100)}$ is not less than 2.4, a ratio of a pore volume of the specific pores to an overall pore volume of the partition wall is 5 to 45%, and a ratio of a pore volume of large pores whose pore diameters is not less than 100 μm to the overall pore volume of the partition wall is not more than 5%.

2. The honeycomb structure according to claim 1, wherein the $T_1$ is 60 to 140 μm.

3. The honeycomb structure according to claim 1, wherein the $T_1/D_{(20\ to\ 100)}$ is 2.4 to 4.0.

4. The honeycomb structure according to claim 1, wherein a porosity of the porous partition wall is 45 to 65%.

5. The honeycomb structure according to claim 1, wherein a cell density of the honeycomb structure body is 46.5 to 116.3 pcs/cm².

* * * * *